Patented Jan. 21, 1936

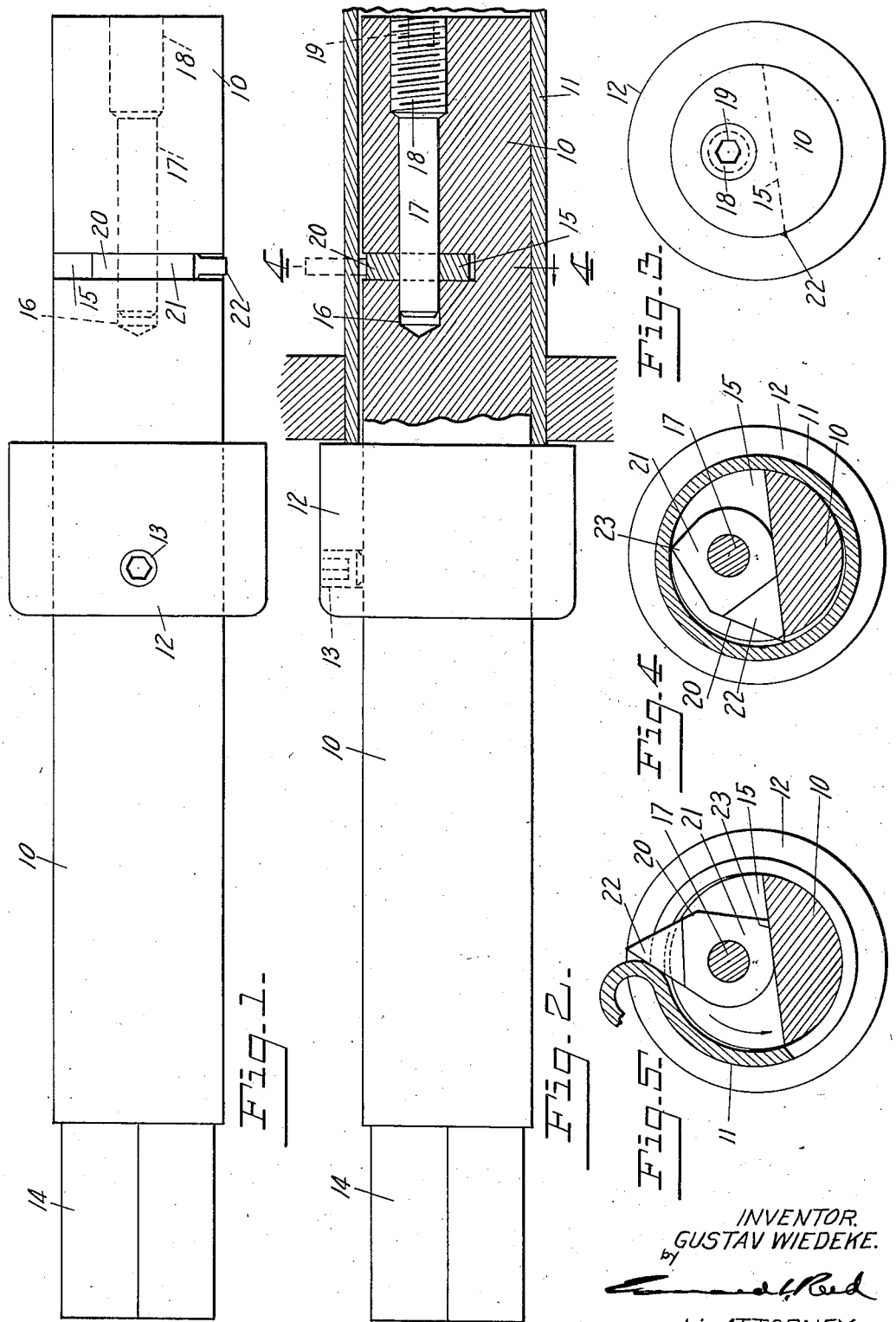

2,028,578

UNITED STATES PATENT OFFICE 2,028,578

TUBE CUTTER

Gustav Wiedeke, Oakwood, Ohio, assignor to Gustav Wiedeke Company, Dayton, Ohio, a copartnership consisting of Gustav Wiedeke, Otto Wiedeke, and Robert Wiedeke Application July 9, 1934, Serial No. 734,405

1 Claim. (Cl. 81—194)

This invention relates to a tube cutter and is designed primarily for use in cutting tubes of small size.

There is in common use a tube cutter comprising a rotatable body or frame having an off center bore in which is rotatably mounted a shaft. At one side of the bore the frame has a transverse slot in which is mounted a cutter the shank of which extends through an opening in the shaft and is rigidly secured therein. The eccentric arrangement of the cutter enables it to be withdrawn within the slot and to be projected beyond the same when the frame is rotated. This cutter is very satisfactory for larger size tubes but with small tubes, such as one and one-half inches in outside diameter and smaller, it is not practical because when made in small sizes the construction is weakened in one or more places to such an extent that the tool will not stand up in service. The shaft must be of a relatively large size in order to receive and support the shank of the cutter and this necessitates a large bore in the frame. If a large bore is used the frame is weakened seriously and if a smaller bore is used the shaft is so small that it is not strong enough to support the cutter, the shank of which must pass through the shaft.

One object of the present invention is to provide a tube cutter of this general type which, when made in small sizes, will have ample strength to cut tubes of ordinary thickness.

A further object of the invention is to provide such a tube cutter which will be very simple in its construction, which will comprise but few parts, and which can be produced at a low cost.

Other objects of the invention will appear as the device is described in detail.

In the accompanying drawing Fig. 1 is an elevation of one side of a tube cutter embodying my invention; Fig. 2 is an elevation of another side of said tool, at approximately ninety degrees to the view shown in Fig. 1, and is partly in section; Fig. 3 is an end elevation of the tool; Fig. 4 is a transverse section taken on the line 4—4 of Fig. 2, showing the cutter retracted; and Fig. 5 is a similar section showing the cutter projected to operative position.

In the drawing I have illustrated one embodiment of my invention and have shown the same as comprising a cylindrical body 10, commonly called the frame, one end of which is adapted to be inserted in, and to be rotated in, the tube which is to be cut, as shown at 11. Preferably the frame is of a diameter sufficiently less than the interior diameter of the tube to permit of the easy insertion and rotation of the frame in the tube but the amount of clearance is not of material importance and may vary. The frame is provided with a stop to limit its insertion into the tube and this stop is here shown in the form of a collar 12 adapted to be secured in adjusted positions on the frame by means of a set screw 13, so that it will engage the end of the tube and limit the inward movement of the frame so as to space the cutter the proper distance from the end of the tube. The frame 10 may be rotated in any suitable manner and, in the present instance, it is provided at its outer end with a square shank 14 adapted to receive a wrench or other implement whereby the frame may be rotated by hand or to receive a coupling member or socket for connecting the frame with a suitable source of power. The frame is provided near its forward end, that is, the end which is to be inserted in the tube, with a transverse slot 15 and which, in the present instance, is of a depth slightly greater than the radius of the frame. The frame is also provided with a longitudinal bore 16 arranged off center with relation to the axis of the frame and which intersects the recess 15 at a point spaced some distance from the bottom wall of that recess. Preferably, to facilitate manufacture, this bore opens through the end of the frame. The bore is of relatively small diameter so that it does not materially weaken the frame. Mounted in this bore is a rod 17 which extends through the recess 15. Preferably this rod fits snugly within the bore and it may be provided with any suitable means for retaining it therein. In the present construction the end portion of the bore is enlarged and screw threaded and the rod 17 has an enlarged screw threaded portion 18 which is threaded into the end of the bore to rigidly secure the rod 17 therein. The rod may be provided with any suitable means for screwing the same into the bore, such as a socket 19 to receive a wrench or the like.

A cutter 20 is mounted in the slot 15 and has a hub portion 21 which is provided with a bearing opening to receive the rod 17, upon which the hub of the cutter is rotatably mounted and which thus constitutes a pivot pin for the cutter. The cutter fits snugly within the slot with just sufficient clearance to permit of its easy rotation on the pivot pin. The cutter also has an outer portion 22 constituting a blade which may be of any suitable shape but is here shown as tapered outwardly to a point. The radial length of the cutter is such that when the blade is moved into contact with or adjacent to the bottom wall of the slot, as shown in Fig. 4, the outer end or point of the blade will lie close to the surface of the frame, preferably projecting slightly beyond that surface but not sufficient to interfere with the insertion of the frame into the tube. When the cutter is rotated about the pivot pin in a clockwise direction in Fig. 4 the blade will project a substantial distance beyond the frame, due to the eccentric arrangement of the pivot pin. The cutter and the frame are provided with cooperating parts to positively interrupt the rotation of the cutter about the axis of the pivot pin 17 when the cutter has been moved to its fully projected position, as shown in Fig. 5. Preferably the hub portion 21 has a part on that side of the pivot pin 17 opposite the blade which is of such a radial length that when the blade is in its fully projected position this part of the hub will engage the bottom wall of the slot and thus positively interrupt the rotation of the cutter, as shown at 23.

When the tool is to be used the cutter is moved to its retracted position, as shown in, Fig. 4, and the frame is inserted in the tube until the stop collar engages the end of the tube or the tube sheet. The outer end of the cutter blade will then lie close to the inner surface of the tube and when the frame is rotated counter-clockwise, as shown in Fig. 4, the point of the blade will bite into the tube and hold the same against rotation with the frame. The continued rotation of the frame, will, due to the eccentricity of the pivot pin, move the cutter bodily to cause the blade to pierce the wall of the tube. The cutter rotates about the pivot pin 17 during this piercing action and thereafter until the part 23 of the cutter hub engages the bottom of the recess, thereby interrupting the rotation of the cutter. The further rotation of the frame in the same direction causes the blade, which now projects through the wall of the tube, to sever the tube, the tube being completely severed by the single rotation of the frame. The cutting edge of the blade may be of any suitable character but, in the present instance, the blade is of a substantial thickness and has a flat front face with sharp corners, which results in the cutting out of a narrow strip of metal from the wall of the tube, as shown in Fig. 5.

Due to the fact that the rod 17 serves merely as a pivot pin and the cutter hub is mounted about the same it may be of a relatively small diameter, thereby permitting the bore in which it is mounted to be correspondingly small, so as to not completely weaken the frame. While the recess is of a sufficient depth to receive the hub of the cutter it leaves ample metal in the opposite side of the frame to give the necessary strength. The cutter being rotatably mounted on the pivot pin which is firmly supported on both sides of the cutter there is no twisting strain imposed upon the frame. As a result the tool, when made in small sizes, will have ample strength. It consists of but four parts, including the stop collar. The construction is very simple and the device can be made at a low cost.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

A tube cutter comprising a rotatable frame having a segmental transverse slot extending through opposite sides thereof, said slot having a substantially straight bottom wall for the full length thereof, a pivot pin mounted in said frame in off center relation thereto and extending through said slot at a point spaced from said bottom wall, and a cutter having a hub portion mounted on said pivot pin within said slot and having a blade portion projecting from one side of said hub portion and arranged to be moved into said slot and to be projected beyond said frame by the rotation of said cutter about the axis of said pivot pin, said hub portion also having on that side thereof opposite said blade a part one end of which is rounded to permit said cutter to move about the axis of said pivot pin and the other end portion of which is provided with a substantially flat surface to engage the bottom wall of said slot when said blade portion has been projected beyond said frame and to interrupt the movement of said cutter about the axis of said pivot pin.

GUSTAV WIEDEKE.